United States Patent [19]

Hoheisel et al.

[11] 4,169,935
[45] Oct. 2, 1979

[54] BIAXIALLY ORIENTED POLYESTER FILM WITH A FLAME-RETARDANT FINISH AND USE THEREOF

[75] Inventors: Klaus Hoheisel, Wiesbaden; Ulrich Bollert, Hofheim-Diedenbergen; Siegfried Janocha, Wiesbaden, all of Fed. Rep. of Germany

[73] Assignee: Hoechst Aktiengesellschaft, Frankfurt am Main, Fed. Rep. of Germany

[21] Appl. No.: 913,339

[22] Filed: Jun. 7, 1978

[30] Foreign Application Priority Data

Jun. 10, 1977 [DE] Fed. Rep. of Germany ....... 2726189

[51] Int. Cl.$^2$ ............................................. C08G 63/68
[52] U.S. Cl. ................... 528/287; 264/290.2; 428/480; 525/1
[58] Field of Search ........................ 528/287; 264/289

[56] References Cited

U.S. PATENT DOCUMENTS

| | | | |
|---|---|---|---|
| 3,941,752 | 3/1976 | Kleiner | 528/287 |
| 4,033,936 | 7/1977 | Bollert et al. | 528/287 |

*Primary Examiner*—Lucille M. Phynes

*Attorney, Agent, or Firm*—Schwartz, Jeffery, Schwaab, Mack, Blumenthal & Koch

[57] ABSTRACT

Disclosed is a biaxially oriented polyester film, wherein the polyester comprises a linear polyester comprising a dicarbocyclic acid and a diol, and further including from about 3 to 20 mole percent of the dicarboxylic acid of a phosphorus-containing chain member having structural units of the formula

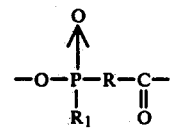

wherein
R is a saturated, open-chain or cyclic alkylene radical, an arylene radical or an aralkylene radical, and
$R_1$ is an alkyl group containing up to 6 carbon atoms, an aryl or an aralkyl group.

Also disclosed is the use of this film as an electrical insulator.

11 Claims, No Drawings

BIAXIALLY ORIENTED POLYESTER FILM WITH A FLAME-RETARDANT FINISH AND USE THEREOF

BACKGROUND OF THE INVENTION

The present invention relates to a biaxially oriented polyester film with a flame-retardant finish.

Biaxially oriented films made of linear polyesters, in particular of polyethylene terephthalate are widely used for industrial purposes. In one very important respect, these films are employed in electrical engineering, for example, in the manufacture of transformers and wire insulations, as flat strip conductors, for cable and slot insulations and in the manufacture of capacitors.

For reasons of safety, for example, in radio and television engineering or in the construction of high-speed motors, it is desirable to attain higher heat categories for these polyester films and to improve their low-flammability characteristics.

In U.S. Pat. No. 3,941,752, low-flammability linear polyesters of dicarboxylic acid and diol components as well as phosphorus containing chain members are disclosed, which are characterized by the fact that the phosphorus containing chain members are structural units having the formula:

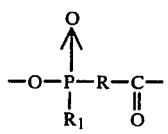

In these chain members, which constitute approximately 3 to 20 mole percent of the acid component of the polyester, R represents a saturated, open-chain or cyclic alkylene radical, an arylene radical or an aralkylene radical, and $R_1$ represents an alkyl group containing up to 6 carbon atoms, an aryl group or an aralkyl group.

Although the abovementioned U.S. Patent indicates that shaped bodies, especially in the form of fibers, may be made of these polyesters, it is not suggested to produce biaxially oriented films for preferred use in electrical engineering applications.

SUMMARY OF THE INVENTION

It is therefore an object of the invention to provide an improved low-flammability, biaxially oriented polyester film.

It is a particular object of the invention to provide such a film having a flame-retardant finish, in which film the special physical properties, in particular the electrical properties, are not inferior to the properties of pure polyester films.

In accomplishing these objects, there has been provided in accordance with the present invention a biaxially oriented film comprised of a linear polyester comprising dicarboxylic acid and diol components and from about 3 to 20 mole percent of the acid component of the polyester of a phosphorus containing chain member comprising structural units having the formula:

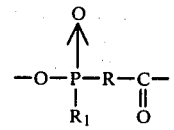

wherein

R is a saturated, open-chain or cyclic alkylene radical, an arylene radical or an aralkylene radical and $R_1$ is an alkyl group containing up to 6 carbon atoms, an aryl or an aralkyl group.

Further objects, features and advantages of the present invention will become readily apparent from the detailed description of preferred embodiments which follows.

DETAILED DESCRIPTION OF PREFERRED EMBODIMENTS

In principle, any of the polyesters specified in the abovementioned U.S. patent (the disclosure of which is hereby incorporated by reference) may be employed in the present invention; however, it is preferred to use polyesters which comprise phosphorus containing chain members having structural units of the formula:

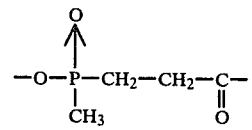

and constituting, in particular, 3 to 10 mole percent of the acid component of the polyester. Although a number of well-known, conventionally used polyesters come into consideration according to the present invention, those of polyethylene terephthalate or polybutylene terephthalate are preferred.

In order to obtain films which shrink to only a small degree, the films according to the invention are preferably heat set.

Since a good blocking resistance is required in many fields of application of the films, known lubricants, preferably $SiO_2$, may be used. In practice, a $SiO_2$ prepared by hydrolysis of silicon halogenides has proved particularly useful.

The films according to the invention are stretched in the longitudinal and transverse directions, in each case at a ratio of from about 2.5 to 4.5, with stretching at a ratio of about 3.5 being preferred. Any of the usual flat and tube stretching methods for polyesters may be used, including multiple stretching in at least one of the directions or simultaneous stretching.

In a preferred embodiment, the film has an ultimate tensile strength of $>200$ N/mm$^2$, in order to withstand high mechanical stresses. The elongation at rupture should be $>100$ percent in the longitudinal and transverse directions.

In many cases films are required which shrink only slightly at high temperatures. Within the scope of the invention, films having a shrinkage of $<5$ percent at 150° C. (measured in air, 15 minutes) are preferred. Films used as electrical insulating films, for example, in the manufacture of capacitors, preferably have a dielectric constant of $>3$ (measured at 150° C; 1 kHz) and a specific volume resistivity of $<10^{18} \Omega \times$ cm (measured at 20° C.). Basically, the films according to the invention may be employed in any field of application where it is desirable to use highly flame-resistant polyester films. Principally, however, the films serve as insulating films, in particular, in electrical engineering applications and in the construction of motors.

Film thicknesses, e.g., for the manufacture of capacitors, usually range between 2 and 15 μm, whereas for slot insulation of electric motors they are normally in the range of 50 to 350 μm. However, the ranges specified do not represent any limitation in the present invention.

In the following, the invention is explained in further detail by means of illustrative examples, without limiting it to the particular embodiments illustrated.

EXAMPLE 1

To polyethylene terephthalate, the acid component of which is substituted by 4.3 mole percent of phosphorus containing chain members having the formula:

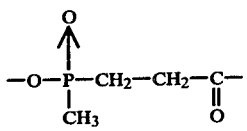

(hereinafter called "Phospholan") and which have an SV value of 905, 0.1 percent by weight of $SiO_2$ is added as a lubricant.

The material is extruded through a slot die at 275° C. and cooled down on a cooling drum at 28° C. The cooled-down sheet is stretched at 85° C. in the longitudinal direction at a ratio of 3.3 and is subsequently stretched at 90° C. in the transverse direction at a ratio of 3.5. The biaxially stretched film is then heat set at 200° C., maintaining a widthwise relaxation of 10 percent.

The 75 μm thick film is used as a low-flammability slot insulation in electric motors.

EXAMPLE 2

The material is produced under the same conditions as in Example 1, except that the "Phospholan" content is 7.1 mole percent.

EXAMPLE 3

The material is produced as in Example 1, except that the final film has a thickness of 6 μm. This film is used as a capacitor film after vacuum metallizing with aluminum.

EXAMPLE 4

The material is produced as in Example 3, except that the final film has a thickness of 12 μm. This film is used for cable insulation.

EXAMPLE 5

The material is produced as in Example 1; however, a polyethylene terephthalate without "Phospholan" is used. These films correspond to those according to the present state of the art.

In the following table the properties of films with and without addition of "Phospholan" are listed:

TABLE

| | | | |
|---|---|---|---|
| "Phospholan" content (in mole percent) | 7.1 | 4.3 | 0 |
| flammability (test method acc. to VDE 0471) | nil | low | flammable |
| dripping | none | none | will always drip |
| self-extinguish after burning | instantly | within 1 second max. | within 10 seconds |
| ultimate tensile strength (N/mm$^2$) | | | |
| long. | 230 | 230 | 230 |
| trans. | 230 | 230 | 230 |
| elongation at rupture (%) | | | |
| long. | 120 | 120 | 120 |
| trans. | 140 | 140 | 140 |
| shrinkage at 150° C. (%) | | | |
| long. | 3.8 | 3.8 | 3.8 |
| trans. | 3.8 | 3.8 | 3.8 |
| dielectric constant (150 °C., 1 kHz) | 4.0 | 3.61 | 3.22 |
| specific volume resistivity (Ω × cm) at 20° C. | $1 \times 10^{17}$ | $2 \times 10^{17}$ | $3 \times 10^{17}$ |

The table shows that the films containing "Phospholan" either cannot at all or can only with difficulty be set on fire. They do not drip, and if it is at all possible to ignite them, the fire will self-extinguish after a very short time.

There is no change in mechanical properties and only a negligible change in the electrical values, as compared to pure polyethylene terephthalate films.

What is claimed is:

1. A biaxially oriented polyester film, wherein the polyester comprises a linear polyester comprising a dicarboxylic acid and a diol, and further including from about 3 to 20 mole percent of the dicarboxylic acid of a phosphorus-containing chain member having structural units of the formula

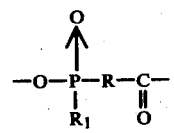

wherein
R is a saturated, open-chain or cyclic alkylene radical, an arylene radical or an aralkylene radical, and $R_1$ is an alkyl group containing up to 6 carbon atoms, an aryl or an aralkyl group.

2. The film in accordance with claim 1, wherein the film is heat set.

3. The film in accordance with claim 1 or 2, further comprising a lubricant.

4. The film in accordance with claim 3, wherein said lubricant comprises $SiO_2$.

5. The film in accordance with claim 4, wherein said biaxial orientation is produced by stretching said film in the longitudinal and transverse directions, in each case at a ratio of from about 2.5 to 4.5.

6. The film in accordance with claim 5, further comprising an ultimate tensile strength of greater than about 200 $N/mm^2$ in the longitudinal and transverse directions.

7. The film in accordance with claim 6, further comprising an elongation at rupture of greater than about 100 percent in the longitudinal and transverse directions.

8. The film in accordance with claim 7, further comprising a shrinkage of less than about 5 percent in the transverse and longitudinal directions, measured at 150° C. (in air; 15 minutes).

9. The film in accordance with claim 8, further comprising a dielectric constant of greater than about 3 (measured at 150° C.; 1 kHz).

10. The film in accordance with claim 9, further comprising a specific volume resistivity of less than about $10^{18} \Omega \times$ cm, measured at 20° C.

11. The film in accordance with claim 1, wherein R is ethylene and $R_1$ is methyl, and said phosphorus-containing chain member comprises from about 3 to 10 mole percent of the dicarboxylic acid.

* * * * *